Aug. 5, 1958 W. T. ZIOLKO 2,845,768
LIFT SYSTEM FOR TRACTOR SIDE MOUNTED HARVESTERS
Filed March 13, 1956 2 Sheets-Sheet 1

Inventor:
Walter P. Ziolko
Paul O. Pippel
Atty.

Aug. 5, 1958 W. T. ZIOLKO 2,845,768
LIFT SYSTEM FOR TRACTOR SIDE MOUNTED HARVESTERS
Filed March 13, 1956 2 Sheets-Sheet 2
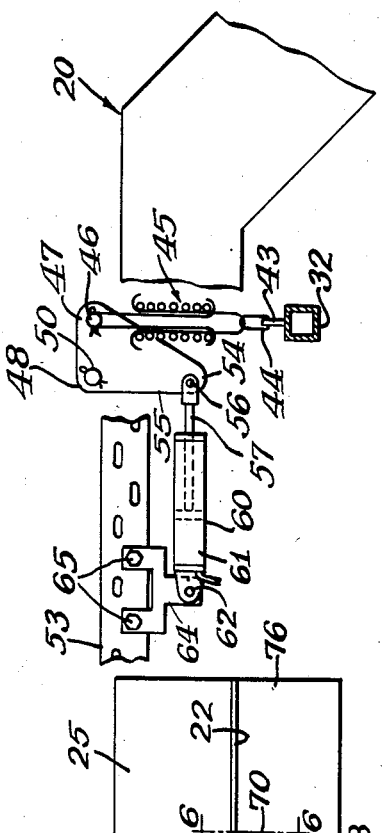
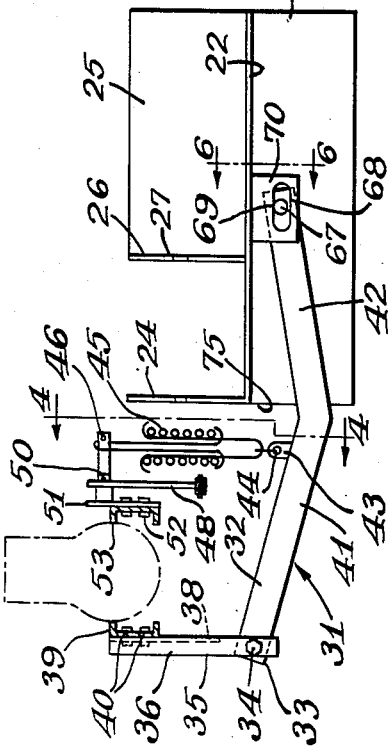
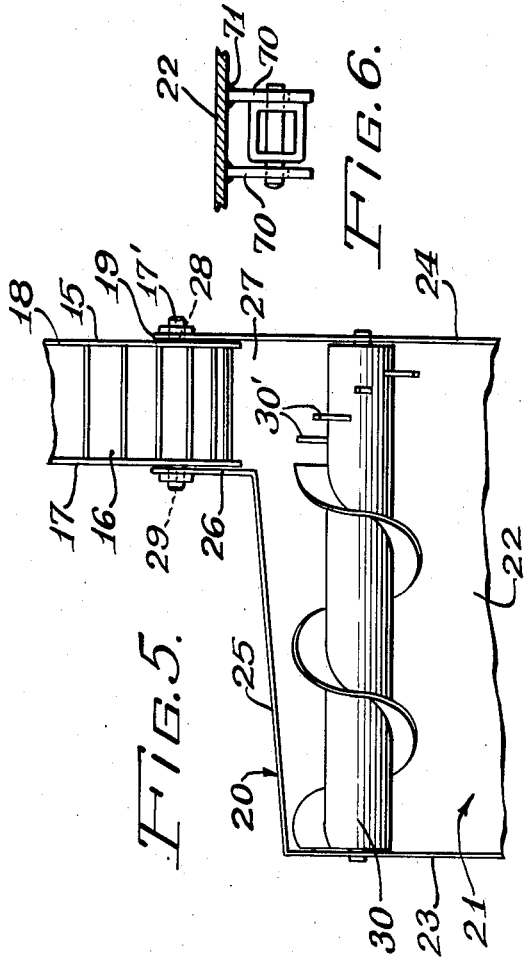
Inventor:
Walter P. Ziolko
Paul O. Pippel
Atty.

United States Patent Office 2,845,768
Patented Aug. 5, 1958

2,845,768
LIFT SYSTEM FOR TRACTOR SIDE MOUNTED HARVESTERS

Walter T. Ziolko, Willow Springs, Ill., assignor to International Harvester Company, a corporation of New Jersey Application March 13, 1956, Serial No. 571,255

1 Claim. (Cl. 56—208)

This invention relates to a mounting for harvesters upon a tractor and more specifically to a novel system for supporting a side-mounted harvester in several operating positions as well as for transport.

A general object of the invention is to provide a novel lift system for a harvester of the type which is mounted upon the side of a tractor and having a rear processing component which is carried by the rear axle structure and a forward harvesting component wherein the harvesting component is swingable about the processing component which is more or less stationarily mounted upon the rear axle of the tractor.

A more specific object of the invention is to provide a novel mechanism of simple and efficient form which is operated to lift and lower the harvesting component through an operating range and wherein the loading points of the system are distributed about the tractor.

A more specific object of the invention is to provide a novel lifting system which incorporates a lever of the third class having a fixed pivot at one end connected to a depending support at one side of the tractor, the lever extending under the tractor and having an intermediate point connected to a hydraulic lifting linkage which is carried upon the side of the tractor opposite to that first mentioned, and the lever having a free arm underposed with respect to the harvesting component and having its distal end provided with bearing means engaging with the underside of the harvesting component forwardly of its pivot about a horizontal axis to the processing component and operative to swing the harvesting component about the horizontal axis upwardly and downwardly attendant to upward and downward movement of the lever.

These and other objects of the invention will become more apparent from the specification and drawing, wherein:

Figure 3 is an enlarged sectional view taken substantially on the line 3—3 of Figure 1;

Figure 4 is a sectional view taken substantially on the line 4—4 of Figure 3;

Figure 5 is an enlarged fragmentary plan view of portions of the harvesting and processing components illustrating the pivotal connection therebetween; and Figure 6 is a sectional view on an enlarged scale taken substantially on the line 6—6 of Figure 3.

Figure 1:
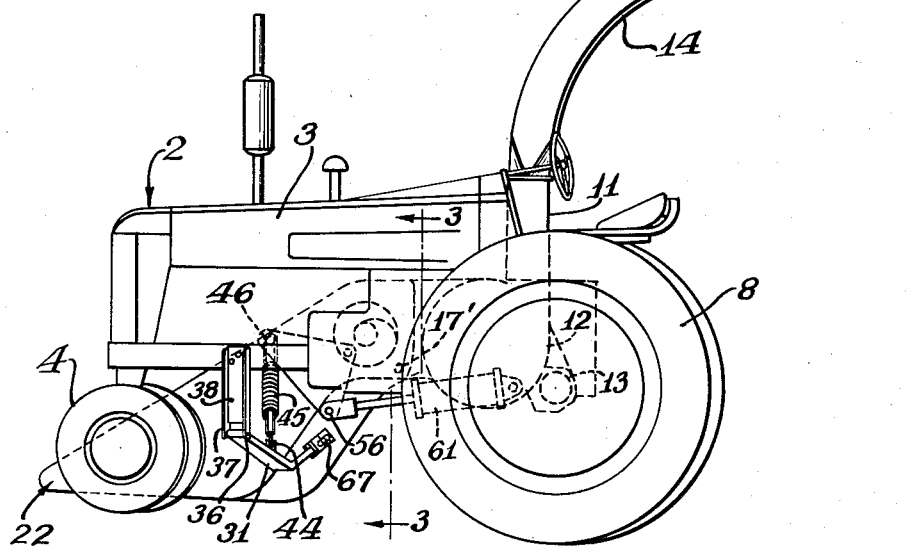
Figure 1 is a side perspective of a tractor and a harvester with the novel lifting linkage applied thereto.

Describing the invention in detail, the tractor 2 is of conventional design and comprises a narrow fore and aft extending body 3 which is carried at its forward end on a steering truck assembly 4 and at its rear end is provided with a transverse rear axle assembly 9 including right and left hand counterparts 5 and 6, each of which carries an axle 7 and a traction wheel 8.

Figure 2:
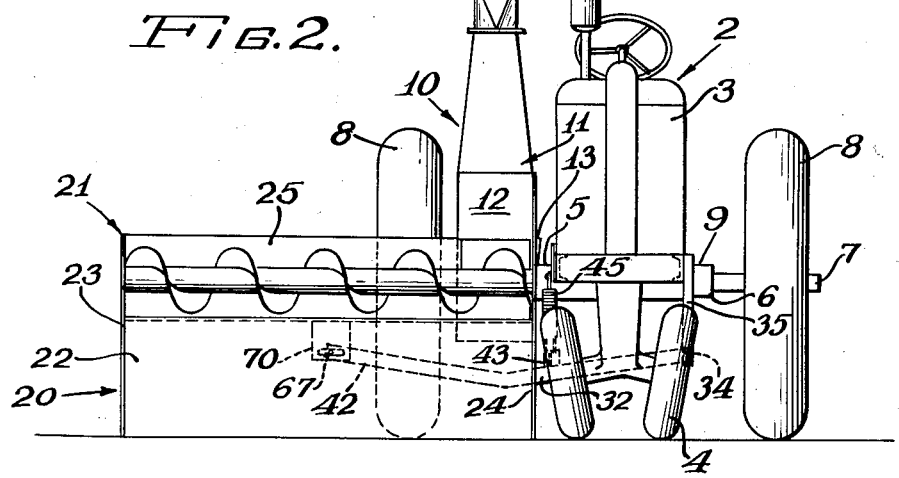
Figure 2 is a front view of the structure shown in Figure 1.

As best seen in Figures 1 and 2, the harvester generally designated 10 comprises a rearward processing component 11 which in the present instance includes a chopper section 12 which has a housing fixedly connected as by brackets 13 to the rear axle structure 9 on the housing communicating with an upwardly extending discharge spout 14 and with a forwardly projecting intake trough 15 within which is positioned a conveyer 16 between the side panels 17 and 18 of the trough. The forward end of the trough 15 is provided with a cross shaft 17' which extends between the panels 17 and 18 forming the sides of the trough, the shaft 17' being suitably journaled on bearings and providing a support in the usual manner through a roller or sprockets, not shown, for the forward end of the apron 16. The shaft 17' also provides a generally horizontal axis of pivot for the rear end 19 of the harvesting component generally indicated 20.

The harvesting component 20 comprises a platform structure 21 which includes a bottom panel 22 joined to a pair of upright side panels 23 and 24, the platform 21 terminating in a rear upright panel 25 which extends inwardly or inboardly from the rear end of the panel 23 and extends in the direction toward the panel 24 and is connected to the fore and aft side panel 26 which is joined with the adjacent portion of the bottom wall 22 of the platform and is spaced outwardly of the panel 24 and defining therewith a narrow throat outlet 27. The rear extremities of the walls 24 and 26 are pivoted as at 28 and 29 on the shaft 17' whereby the harvesting component 21 is swingable upwardly and downwardly. In the present instance the harvesting component is shown as comprising a wide platform and a narrow throat structure and the lateral conveying means 30 in the form of an auger with retractable fingers 30' for moving the crops laterally and then rearwardly as will be readily understood by those skilled in the art. However, it will be understood that the instant invention is applicable to narrow or wide throat or what are commonly known as straight-through harvesters as shown in U. S. Patent No. 2,729,048, and that the instant design is merely chosen for purposes of illustration.

The lifting system, generally designated 31 (Fig. 3) comprises a lever member 32 in the form of box section beam, the member 32 extending transversely of the tractor beneath the body portion thereof and having a first end or proximal extremity 33 pivoted as at 34 to the lower end of a depending channel-shaped support or fulcrum 35 between the flanges 36 and 37 thereof, the upper end of the bracket 35 having its web 38 seated against the leftward fore and aft extending sill member 39 of the tractor and secured thereto as by bolts 40. The lever member 32 has a pair of downwardly converging inboard and outboard portions 41 and 42 which are integrated intermediate the ends of the lever, the portion 41 sloping, as best seen in Figure 3, downwardly outboardly and the portion 42 sloping downwardly tractorwardly. The leg portion 41 is provided adjacent to its lower end, that is substantially medially of the lever 32, with an upstanding lug 43 to which is connected the lower end as at 44 of a spring assembly 45, the upper end of the spring assembly being connected as at 46 to the fore and aft extending leg 47 of a bell crank generally designated 48 which intermediate its ends pivots on a horizontal axis on a pin 50 which is suitably supported on a bracket 51 which is connected as by bolting 52 to the right sill member 53. It will be observed that the bracket 35 and the bracket 50 are disposed intermediate the ends of the body portion of the tractor that is between the traction wheels and the front steering wheel assembly 4 and are generally transversely aligned and disposed at opposite sides of the tractor. The lower end 54 of the downwardly extending leg portion 55 of the bell crank 48 is connected as at 56 to the piston 57 of the hydraulic motor or piston and cylinder assembly 60 which has its cylinder 61 pivotally connected as at 62 on a generally horizontal axis to a depending bracket 64 which is connected by bolts 65 to the sill member 53 rearwardly of the bracket 51.

The outboard portion 42 at the member 31 is underposed with respect to the harvester platform structure 21 intermediate its forward and rear extremities and is provided with a bearing in the form of a transverse pin 67 which is fixed to the leg 42 at its distal end. Opposite ends of the pin project into generally horizontally elongated slots 68 which provide marginal edges 69, the slots being formed in depending plates 70 which depend from the underside 22 of the platform and are welded thereto at 71.

*Operation of the device*

In operation, assuming that the device has its forward harvester portion 20 disposed in downward operating position as shown in Figures 1 and 2, in order to raise the platform to various operating heights or to transport position, the hydraulic motor 60 is actuated to extension whereby the piston 57 moves rightwardly, Figure 4, rotating the bell crank 48 in a counterclockwise direction and thereby lifting the yieldable linkage 45 upwardly with attendant lifting of the lever arm 31 upwardly about the pivot point 34 and thus raising the platform 21 attendant to upward swinging of the arm 42. It will be observed that the loading of the platform is at a point which is substantially medial between the inboard and outboard sides 75 and 76 of this forward harvester component in laterally balancing relationship thereto. This point may be chosen to substantially effect fore and aft balance although this is not of such critical importance as obtaining substantially lateral balance. It will be observed that the portion 42 where it enters between the plates 70 is spaced transversely of these plates in order to accommodate the upward swing of the platform. It will also be observed that the slots 68 in the pin 67 are not close fitting so that there is no bind in the joint developed inasmuch as the arms swing about an axis which is preferably at right angles to the axis of upward swinging of the platform about the shaft 17. In order to lower the platform the cylinder 60 is collapsed and the parts move in reverse directions to that described in connection with the lifting thereof.

What is claimed is:

The combination of a tractor having a longitudinal narrow body wheel-supported at opposite ends, a harvester situated at a first side of said body and having a forward harvesting component including a laterally elongated platform, a rear component connected to said tractor and pivotally connected to said harvesting component on a generally horizontal axis extending transversely of the tractor intermediate the ends of said body, a lever extending lengthwise transversely of said body therebeneath, fulcrum means on the second side of said body remote with respect to said harvester and depending from the body and having a lower end, said lever having a proximal end adjacent to the lower end of the fulcrum means, means pivotally mounting the proximal end of said lever on an axis extending lengthwise of the tractor on said lower end of said fulcrum means, said lever having a first portion extending diagonally downwardly laterally of the tractor from the second toward said first side of the body beneath the same and terminating outwardly of said first side at a lowest elevation and having a second portion extending diagonally upwardly from said first portion and terminating in a distal end located beneath said platform, and means interconnecting said distal end with the platform at a point in substantially laterally counterbalancing relationship thereto and comprising dependent plates on said platform loosely embracing said distal end therebetween, and a fore and aft extending pin connected to said distal end and projecting through slots elongated lengthwise of the lever, and lifting means on said body comprising a bell crank lever pivoted on a generally horizontal axis to the first side of the tractor and having a forwardly extending leg and a downwardly extending leg, a hydraulic ram disposed along said first side and pivoted to said tractor and to said downwardly extending leg, and a resilient linkage connecting said forwardly extending leg to said first portion at a point adjacent to its lowest elevation.

References Cited in the file of this patent

UNITED STATES PATENTS

| | | |
|---|---|---|
| 1,690,809 | Barnard et al. | Nov. 6, 1928 |
| 2,700,857 | Stearman | Feb. 1, 1955 |